(12) United States Patent
Nakash

(10) Patent No.: US 9,509,591 B2
(45) Date of Patent: Nov. 29, 2016

(54) TECHNIQUE FOR DUAL HOMING INTERCONNECTION BETWEEN COMMUNICATION NETWORKS

(75) Inventor: Shell Nakash, Kfar-Sava (IL)

(73) Assignee: ECI TELECOM LTD., Petach-Tikva (IL)

( * ) Notice: Subject to any disclaimer, the term of this patent is extended or adjusted under 35 U.S.C. 154(b) by 883 days.

(21) Appl. No.: 13/391,267

(22) PCT Filed: Aug. 9, 2010

(86) PCT No.: PCT/IL2010/000643
§ 371 (c)(1),
(2), (4) Date: Feb. 17, 2012

(87) PCT Pub. No.: WO2011/021180
PCT Pub. Date: Feb. 24, 2011

(65) Prior Publication Data
US 2012/0147740 A1 Jun. 14, 2012

(30) Foreign Application Priority Data

Aug. 20, 2009 (IL) .......................................... 200504

(51) Int. Cl.
| | | |
|---|---|---|
| *H04L 12/705* | (2013.01) | |
| *H04L 12/703* | (2013.01) | |
| *H04L 12/437* | (2006.01) | |
| *H04L 12/46* | (2006.01) | |
| *H04L 12/715* | (2013.01) | |
| *H04L 12/707* | (2013.01) | |

(52) U.S. Cl.
CPC .............. *H04L 45/18* (2013.01); *H04L 12/437* (2013.01); *H04L 12/4604* (2013.01); *H04L 45/04* (2013.01); *H04L 45/22* (2013.01)

(58) Field of Classification Search
None
See application file for complete search history.

(56) References Cited

U.S. PATENT DOCUMENTS

| | | | |
|---|---|---|---|
| 6,226,260 B1 * | 5/2001 | McDysan | ...................... 370/216 |
| 7,715,713 B1 * | 5/2010 | Iyer | ..................... H04J 14/0227 398/58 |
| 8,203,931 B2 * | 6/2012 | Caviglia | .................. H04J 3/085 370/216 |
| 2002/0003639 A1 * | 1/2002 | Arecco | .................. H04J 14/022 398/59 |
| 2003/0031124 A1 | 2/2003 | Chow et al. | |
| 2003/0142680 A1 * | 7/2003 | Oguchi | ........................ 370/400 |
| 2006/0047851 A1 | 3/2006 | Voit et al. | |
| 2008/0101364 A1 | 5/2008 | Chow et al. | |
| 2008/0222447 A1 * | 9/2008 | Ram et al. | ........................ 714/2 |
| 2009/0059800 A1 | 3/2009 | Mohan | |

FOREIGN PATENT DOCUMENTS

| | | |
|---|---|---|
| EP | 2 023 568 | 2/2009 |
| EP | 2 027 676 | 2/2009 |

OTHER PUBLICATIONS

H-VPLS N-PE Redundancy for QinQ and MPLS Access, Author: unknown. Cisco Systems, Inc., Nov. 15, 2007; pp. -15.
(Continued)

*Primary Examiner* — Hassan Phillips
*Assistant Examiner* — Saba Tsegaye
(74) *Attorney, Agent, or Firm* — Novick, Kim & Lee, PLLC; Harold L. Novick; Jae Youn Kim

(57) ABSTRACT

A dynamically self-configuring and re-configuring dual homing connection (DH) for loop-free data communication between a first communication network and a second communication network, the DH acquiring either a Symmetrical configuration or an Asymmetrical configuration.

10 Claims, 5 Drawing Sheets

(56) References Cited

OTHER PUBLICATIONS

International Search Report mailed Dec. 12, 2010, in International Application PCT/IL2010/000643, filed Aug. 9, 2010, including Written Opinion.

Lasserre et al., Virtual Private LAN Service (VPLS) Using Label Distribution Protocol (LPD) Signaling, RFC 4762, available at http://tools.ietf.org/tools/rfcmarkup/, Jan. 2007; pp. 1-34.
Muley et al., Pseudowire (PW) Redundancy, available at http://tools.ietf.org/tools/rfcmarkup/, Mar. 29, 2009; pp. 1-17 (2 copies).
Resilient Inter-Metro Hierarchical VPLS, Author: unknown, Alcatell, 2004; pp. 1-10.

* cited by examiner

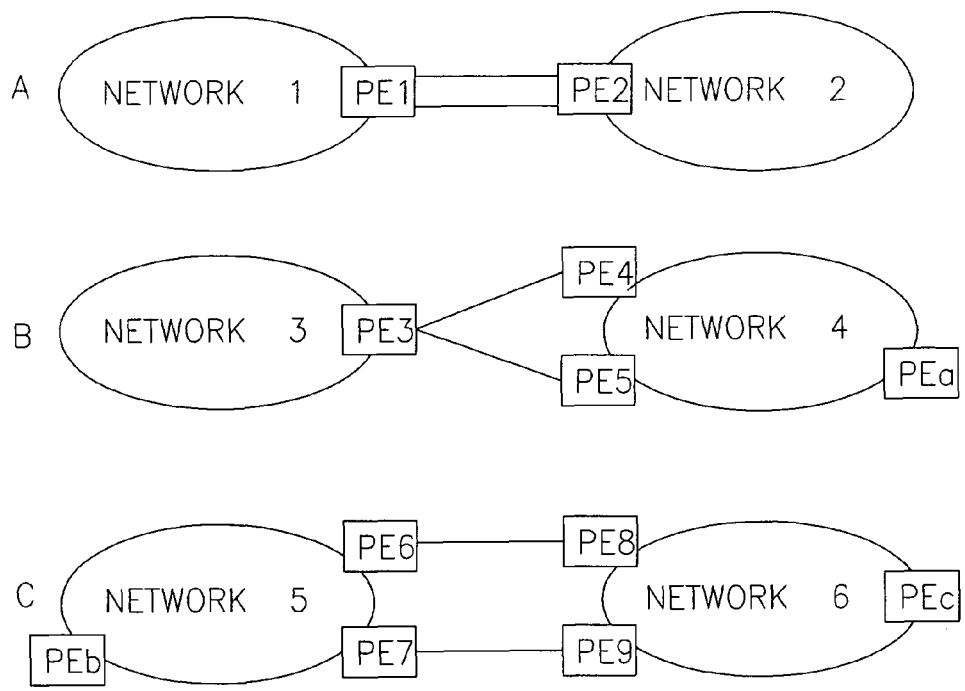
FIG.1
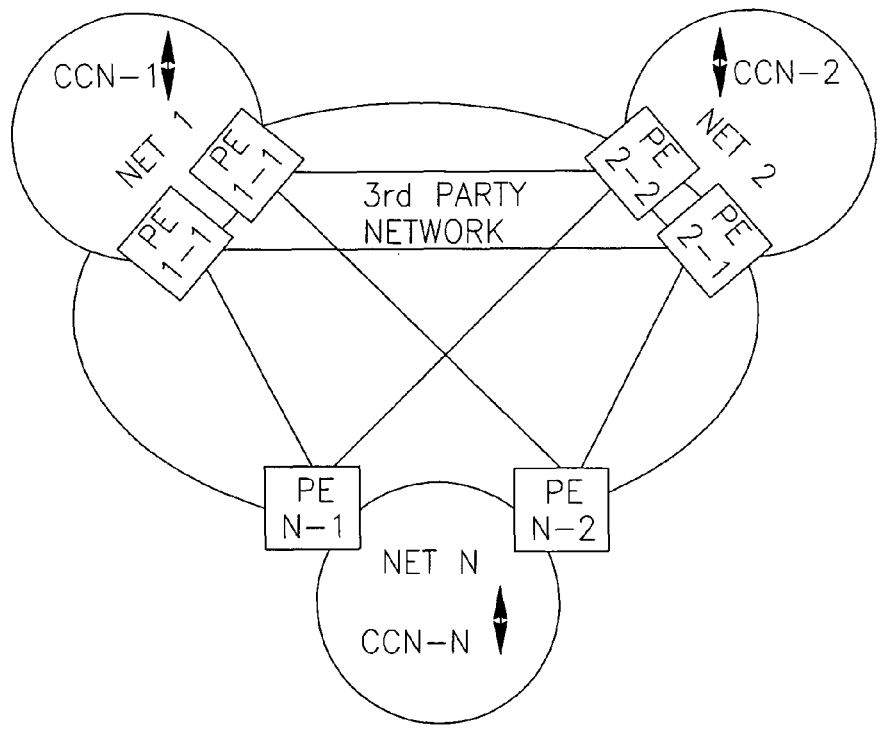
— L2 PIPE    FIG.2

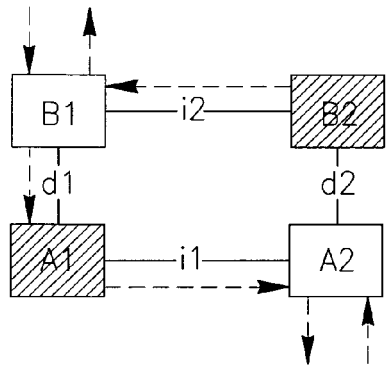
(a) NORMAL TRAFFIC FLOW
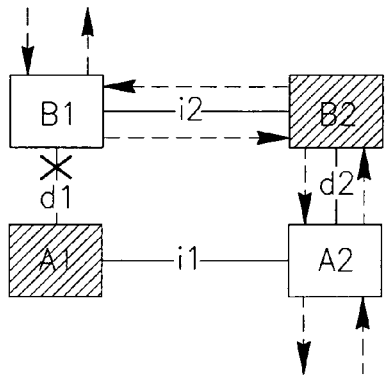
(b) d-PW DOWN
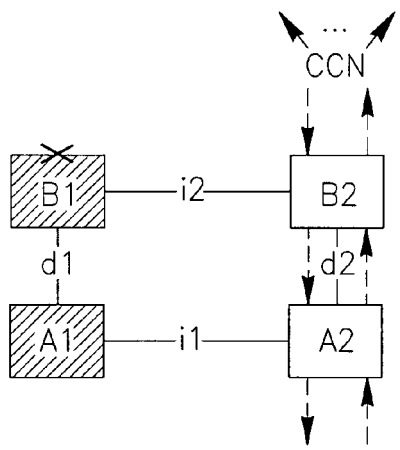
(c) P DOWN
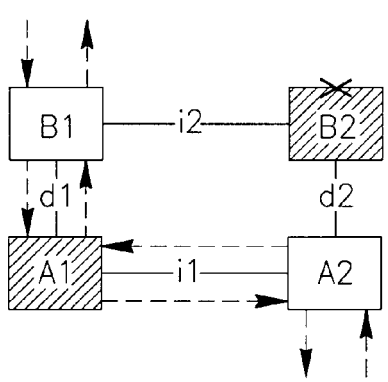
(d) S DOWN
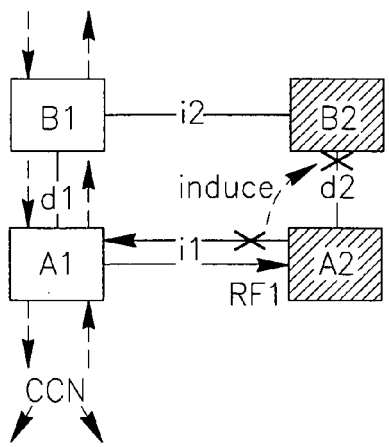
(e) SECONDARY NOT RECEIVING ON i-PW
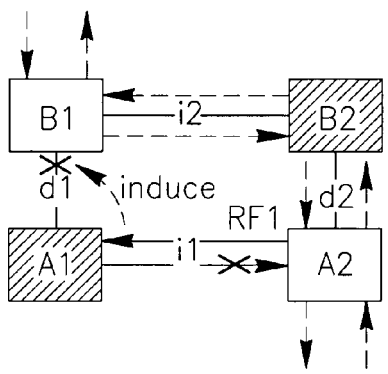
(f) PRIMARY NOT RECEIVING ON i-PW
FIG.6

TECHNIQUE FOR DUAL HOMING INTERCONNECTION BETWEEN COMMUNICATION NETWORKS

FIELD OF THE INVENTION

The invention relates to a technique for loop-free protected dual homed connectivity between layer 2 (L2) networks and in a specific case, for fully redundant loop-free H-VPLS connectivity between multiple VPLS networks.

BACKGROUND OF THE INVENTION

L2 Network 10

An L2 network (abbreviated-network) is composed of L2 bridges (a.k.a., L2 switches) connecting local area networks (LAN) or IEEE 802.1Q virtual LAN (VLAN) segments containing end stations. A switch forwards L2 frames (packets) between its interfaces (ports) based on L2 media access control destination address (MAC DA) carried by each packet. A switch performs address learning based on L2 MAC source address (MAC SA) carried by each packet. This procedure is also called MAC learning. If a switch receives a packet with a known unicast DA (i.e., one it has previously learned as SA), it would forward the packet to the port from which it learned the address. Otherwise, if the DA is unknown unicast (has not been learned) or multi-destination (multicast or broadcast), it would forward a packet copy to all the ports, this action is referred to as flooding. A port may belong to multiple LANs, known as virtual LANs (VLANs), in which case the address learning and forwarding is based on L2 address combined with VLANs carried by the packets.

In addition, the provider may map the customer traffic into Provider Service VLANs (SVLANs) using VLAN stacking techniques (so called Q-in-Q encapsulation) in order to partition traffic of one customer from another. Such networks are called provider bridge (PB) networks.

VPLS

A virtual private LAN service (VPLS) emulates the functionality of a LAN making it possible to interconnect multiple access networks over a VPLS network while all these access networks together behave as one single LAN or virtual LAN (VLAN). With VPLS, all these access networks would be assigned the same L2 virtual private network (L2 VPN or VPN) identifier. This is analogous to assigning them the same SVLAN in an Ethernet-based provider network. For convenience, we will refer to both SVLAN and VPLS instances as VPNs.

VPLS networks generally perform better than PB networks. With VPLS, Ethernet packets arriving from the access network are encapsulated in multi-protocol label switching (MPLS), based on which they are forwarded across the provider network towards the remote sites. This use of MPLS enables to build networks that excel in performance, quality of service (QoS) for service differentiation, traffic engineering (TE) for optimal utilization of network resources, high resiliency (particularly fast rerouting, FRR), and high scalability.

VPLS architecture implements full mesh connectivity between the provider edge (PE) nodes that connect the customer access networks, this allows each access network to communicate with any other access network belonging to the same VPN. Each PE-PE path carrying VPN traffic is called a pseudo-wire (PW).

Since there is a PW between any two PEs, a PE receiving a packet from PW must not forward it on another PW, otherwise the destination PE might receive two packet copies. This is referred to as a split horizon rule.

As an alternative to using Ethernet-VLAN for connecting networks is to classify customer traffic to specific VPN, the connection is so-called spoke pseudowire (spoke PW or just spoke). With this method, known as hierarchical VPLS (H-VPLS), Ethernet packets already arrive encapsulated with MPLS headers over the connection to the provider network. Spoke PWs are generally not subject to the split horizon rule, i.e., a PE receiving a packet from VPLS PW can forward it on spoke PW and vice versa. H-VPLS is potentially preferred over either Ethernet or VLAN (Ethernet-VLAN) owing to its MPLS advantages.

It should be understood that an H-VPLS spoke carries traffic of a single VPN. If multiple VPNs are needed per link between networks, each VPN would have its own H-VPLS spoke flowing in parallel with the other spokes.

Dual Homing

An important if not mandatory feature in packet-based applications is effective redundancy, which enables fault-tolerant and reliable networks. One form of fault tolerant connectivity is the so-called dual homing. With dual homing configuration, a device or a network is connected to another device or network via two connections, such that when one connection fails the other one serves for carrying the traffic. Dual homing can either be partially redundant or fully redundant. Both of the dual homing forms use two connections between the L2 gateway (GW) devices, however only the fully redundant dual homing protects against any single link or GW failure at the interconnection.

Dual homing switchover would generally require the flushing (a.k.a., MAC flush) the forwarding information base (FIB) holding the L2 addresses learned, once the new GW takes over, since otherwise other nodes in the network might continue sending the known unicast traffic to the previous GW who is presumably down, until a periodic (typically 5 minute period) address aging occurs. After the flush occurs at a network node, it would flood L2 traffic thus reaching all destinations until address learning takes place. The address flushing is generally performed per VPN and is achievable using dedicated messaging, such as the LDP Address Withdraw Message (RFC 4762), or the Customer Change Notification (CCN) defined at draft-ietf-l2vpn-vpls-bridge-interop-04.txt. The spanning tree protocol (STP) and its variants (RSTP, MSTP), all of which are hereby referred to as xSTP, have a built-in MAC flush mechanism applied following a topology change. All the address flushing messages are hereby referred to as CCN messages. The detriment of CCN is the subsequent flooding of traffic, which may overload the network nodes, and result with considerable traffic loss.

Dual homing configurations are illustrated in FIG. 1 (Prior art):

Configuration A is partially redundant, because when GW PE1 or PE2 fails, the connectivity between network 1 and network 2 is lost Configuration B is partially redundant, because when GW PE3 fails, the connectivity between network 3 and network 4 is lost Configuration C is fully redundant, because for any single link (either link PE6-PE8 or link PE7-PE9 or single GW (either of PE6, PE7, PE8, or PE9) failure, the connectivity between network 5 and network 6 could remain intact.

CCN messaging is required at network 4 when PE5 takes over PE4. This is required in order that PEa would stop sending known unicast traffic to network 3 through the failed PE4. Similarly, CCN messaging is required when PE4 takes over PE5.

CCN messaging is required at both networks 5 and 6 when PE7 takes over PE6. This is required in order that PEb (PEc) would stop sending known unicast traffic to network 6 (network 5) through the failed PE6, respectively. Similarly, CCN messaging is required when PE6 takes over PE7, or when PE8 takes over PE9 or vice versa.

While dual homing can improve network reliability, its application is not straightforward. If two networks are connected via dual homing where both connections are active, a L2 loop occurs. Multicast or broadcast traffic introduced into dual homed connection, might keep circulating indefinitely between the connected networks. Assuring loop-free topology is therefore essential to proper operation of Ethernet networks. Without a proper dual homing, H-VPLS benefits would be rendered impractical.

Prior Art solutions

The methods referred to below are analyzed from the point of satisfying a number of main conditions/objectives stated by the Inventor, wherein the objectives are listed in the section of Object and Summary of the invention (since most of them comprise inventive subject matter)

There have been proposed several methods for dual homed connectivity between devices and networks:

(1) IETF RFC 4762, section 10.2.1 (VPLS standard) proposes a partially redundant dual homing, where the dual homed device forces one of the dual homing connections to a standby mode, during which it does not actively carry traffic.

"To protect from connection failure of the PW or the failure of the PE-rs, the MTU-s or the PE-r is dual-homed into two PE-rs devices . . . The MTU-s negotiates the PW labels for both the Primary and Secondary PWs, but does not use the Secondary PW unless the Primary PW fails."

It further does not propose any form of redundancy for connecting VPLS networks via H-VPLS:

"Two fully meshed VPLS networks are connected together using a single LSP tunnel between the VPLS "border" devices. A single spoke PW per VPLS service is set up to connect the two domains together . . . . This document does not specify how redundant border PEs per domain per VPLS instance can be supported."

In summary, this approach does not support the fully redundant dual homing (the Primary objective-A1-of full redundancy).

(2) draft-ietf-pwe3-redundancy-01.txt is aligned with RFC 4762 described above, and only addresses a partially redundant dual homing. This is exemplified by FIG. 1 there, where a single CE device is dual homed with two AC connections to the PW-based network. If CE device were part of a CE network, that network would be disconnected from the PW-based network once the CE device failed.

In summary, this approach also does not support fully redundant dual homing (the Primary objective A1).

(3) http://www.alcatel.com/doctypes/opgapplicationbrochure/pdf/Resilient_HVPLS_a n.pdf (hereby referred to as Alcatel's), achieves fully redundant H-VPLS connectivity between networks using xSTP. A drawback of this method is the need to maintain xSTP (along with its built-in CCN) interaction among the GWs of the different networks. This is especially complicated when the dual homing connectivity is created between two networks running under different administrations, due to the xSTP provisioning and maintenance burden it inflicts upon the parties involved.

In summary, this approach does not confine the protocol to the two local GWs (objective A2), cannot work with mixed network configurations (A3), does not confine the CCN to the local network (A4), and uses xSTP (A5).

(4) US 2006/0047851 (further referred as Cisco's) proposes a method in which a local node u-PE is dual homed to two local nodes Agg-PEs and can communicate with remote nodes u-PE in a loop-free manner, wherein all of the involved local/remote u-PEs and Agg-PEs run a common xSTP protocol in order to break the L2 loop. This method uses xSTP between the u-PE and Agg-PE, wherein the (xSTP) signaling is not a local matter on the border of the two connected networks, since it involves both the local and remote u-PEs and Agg-PEs.

In summary, this approach does not confine the protocol to the two local GWs (objective A2), cannot work with mixed network configurations (A3), does not confine the CCN to the local network (A4), and uses xSTP (A5)

(5) http://www.cisco.com/en/US/docs/ios/mpls/configuration/guide/mp_hvpls_npe_re d.html#wp1054360 (further referred as Cisco's website) describes two configurations: (a) One configuration provides partially redundant dual homing when connecting networks with H-VPLS (FIG. 2 there), as when U-PE fails the connectivity to the network represented by N-PE1 through N-PE4 is lost. This configuration therefore fails to address the Primary objective A1; (b) Another configuration runs xSTP (along with its built-in CCN) between the access network (U-PE) and the aggregate network (N-PEs) to provide partially redundant dual homing when connecting networks with Q-in-Q (FIG. 1 there). Though there are two U-PEs in the picture, there is actually a single U-PE per VLAN (VPN), thus no full redundancy. This configuration therefore fails to address the Primary objective A1. It further does not confine the protocol to the two local GWs (objective A2), cannot work with mixed network configurations (A3), does not confine the CCN to the local network (A4), and uses xSTP (A5).

(6) EP2027676 A1 (US2009274155 AA, Technique for Providing Interconnection between Communication Networks proposes an approach that provides a fully redundant dual homing. It meets objectives A1 for fully redundant dual homing, A2 for local protocol per network, A3 for mixed networks capability, A5 for protocol simplicity, and A7 for protection time. However, this solution fails to address: (a) A4 and B3, because the CCN must be propagated to $3^{rd}$ party network as well as the GWs of the remote networks; (b) A8, because a GW must run a separate protocol instance per each physical link it uses to connect to $3^{rd}$ party network; (c) B4, because there is a need for a full mesh of $3^{rd}$ party pipes between any two connected networks. This is so because each network independently selects the active GW (designated forwarder, or Primary node), and when it fails the other one would take over and should have a pipe per each of the GWs of the remote network, as only one GW per remote network is presumably active; (d) B5, because $3^{rd}$ party connections should be protected.

OBJECT AND SUMMARY OF THE INVENTION

Objectives formulated by the Inventor for a novel Dual Homing configuration. The inventive solution should meet one or more of the objectives formulated below. In practice, the typically required architecture is composed of N networks interconnected with the aid of a fully redundant dual homing configuration via an underlying $3^{rd}$ party network, as illustrated by FIG. 2 (Target network architecture):

Connected (Remote) Networks:

(A1—Primary Objective) A connected network must provide a loop-free fully redundant dual homing, via its two GW PEs (GW pair). For example, network 1 has GWs PE1-1 and PE1-2 for connection with other networks, and if one of the GWs fails, the other one would be used for communicating with the remote networks.

(A2) A protocol to break an L2 loop (further referred to as: protocol, or loop protocol) must be confined to the two local GW PEs (GW pair) of a specific network. In other words, a single loop protocol instance should be run on a GW pair. This can be referred to as a distributed dual homing architecture, in the sense that each network runs the protocol locally regardless of the state of protocol at other networks. This can reduce implementation effort (protocol taking part between 2 rather than among 2N elements, where N is the number of networks), reduce susceptibility to the failure of inter-network connections in the protocol spanned multiple networks, and also simplify interoperability with networks that do not support the protocol (so-called No-Protocol networks). It would also be more secure than a cross-network messaging which could be maliciously deformed, discarded, or otherwise manipulated.

(A3) The solution should preferably work with a mixed network configuration, where some (one up to all) of the networks run the protocol while others (referred to as No-Protocol networks) do not. A reasonable compromise should be offered compared to case where all networks run the protocol, however the requirement for fully redundant dual homing should preferably be kept.

(A4) CCN messages should preferably be confined to the local network and be avoided at all for failures that tend to occur more frequently. For example, if PE 1-1 of network 1 fails, a CCN message (marked CCN-1) should take place at network 1 only, and should not be sent to networks 2 through N. As another example, a failure of the connection PE 1-1 to PE 2-1 would typically occur a lot more frequently than a failure of a GW, because the former traverses multiple nodes and links (e.g., fiber optic cut) within $3^{rd}$ party network and is not protected there (see B5). It is therefore desired that a failure of this connection would not trigger CCN at any of the networks.

(A5) The protocol must be scalable and simple, compared to protocols such as xSTP (that are designed to handle loops on large scale topologies with the number of nodes n>>2, and would eventually face scalability problems as n increases, or/and provide an "overkill" solution for our target case of n=2.

(A6) The solution must not require more than two connections between any two networks, because two connections are obviously the minimal connectivity required for fully redundant dual homing. In particular, there must not be required a full mesh connectivity between any two networks, as this would result with 100% extra connections, bandwidth, and configuration. For example, network 1 has two connections with network 2, one connection between PE1-1 and PE2-1 and the other between PE1-2 and PE2-2. There must not be a need for the additional connections PE1-1 to PE2-2 and PE1-2 to PE2-1.

(A7) Recovery following a failure of a GW PE or a connection between two networks must be automatic and should be fast, that is, completed in a short time (sub-second and preferably sub-50 milliseconds).

(A8) The single protocol instance that runs on a pair of GWs (GW PEs), should preferably be agnostic to how many physical links are used to carry the inter-network connections (e.g., the connections PE 1-1 to PE 2-1 and PE 1-1 to N-2could go over same physical link or two separate physical links with which PE 1-1 is connected to $3^{rd}$ party network). This can potentially save software resources to run the protocol by the GW PEs, compared to running a protocol instance per physical link. Thus, if the GWs "agree on their roles" according to the proposed protocol, that would apply to all physical links that a GW uses to connect to $3^{rd}$ party (the physical links terminate at GW at one end and at the adjacent $3^{rd}$ party node at the other end).

(A9) The single protocol instance that runs on a pair of GWs (GW PEs), should be able to cover also all VPNs, regardless of the number of remote networks. Thus, if the GWs agree on their roles, that would apply to traffic of all VPN traffic exchanged with remote networks.

(A10) The solution should preferably support also a partially redundant dual homing. For example, network 1 may prefer to use only one GW (say, PE 1-1) in order to reduce costs.

(A11) The networks would typically be realized as VPLS networks while the connections between the networks (inter-network connections) would be H-VPLS spokes per VPN. However, other realizations are possible, e.g. the networks could be SVLAN-based (PB networks) and the inter-network connections could be Q-in-Q.

(A12) The solution should support also so-called stub networks. A stub network is connected to only one network. For example, Net 1 of FIG. 2 would be a stub network if it were to connect only to Net 2, that is, the spoke PE 1-1 to PE n-1 and PE 1-2 to PE n-2 would only exist for n=2.

$3^{rd}$ Party Core Network:

(B1) A $3^{rd}$ party network (sometimes referred to as a core network, to distinguish it from the other networks it connects), need only provide layer 2 "pipes" to allow the data packet connectivity.

(B2) $3^{rd}$ party network need not be aware of the dual homing connectivity, that is, it need not run a loop protocol with the connected networks.

(B3) $3^{rd}$ party network need not be aware of topology changes at the connected networks. In particular, it need not recognize CCN messages nor does it need to generate CCN messages of its own in response to topology changes at the connected networks.

(B4) The solution must not require more than two pipes between any two networks, as two pipes are the minimal connectivity for fully redundant dual homing. In particular, there must not be required a full mesh of pipes between any two networks, as this would result with 100% extra connections, bandwidth, and configuration.

(B5) The pipes need not be protected at $3^{rd}$ party network, as this would be resource (e.g., BW) wasteful.

(B6) The pipes would typically be realized using L2 virtual point-to-point connections, a.k.a. virtual private wire service (VPWS) or E-LINEs. However, other realizations are possible, e.g. partial-mesh VPLS, VLAN or SVLAN virtual wires, or even leased lines.

It is therefore the object of the present invention to provide a technique for connecting multiple Ethernet and/or VPLS networks using a dual homing configuration that would be capable of preventing L2 traffic loops while addressing all the objectives/conditions listed above.

The above objectives can be achieved by providing a dual homing (DH) technique which comprises both a new DH connection as a structure, and a new method for establishing loop free communication via such a DH structure. It should be appreciated that the disclosure below, being formulated using terms of method and/or structure, equally relates to the DH connection and to the related method, and that it is equally applicable for describing and claiming the structure and the method. According to a first main aspect of the invention, there is proposed a dual homing (DH) connection or a DH system capable of self-configuring and reconfiguring, for resolving the above-stated objectives:

A dual homing connection (DH) for loop-free data communication between a first communication network and a second communication network, wherein the dual homing connection comprises four nodes (edge node, gateways, GW) and a ring-like connection formed there-between by four communication lines, two of said lines being inter-network lines respectively connecting two inter-network pairs out of said nodes where each inter-network pair comprises nodes residing in different said two networks, and the remaining two of said lines being intra-network lines respectively connecting two intra-network pairs of said nodes (intra-network node pairs) where a first intra-network node pair resides in (belongs to) the first communication network and a second intra-network node pair resides in (belongs to) the second communication network, in the DH:

all the four communication lines are capable of carrying data to be communicated via the DH, each of the two intra-network node pairs locally running an instance of a loop protocol (a protocol instance, being one copy of the loop protocol) via its associated intra-network line, independently from the protocol that is run by other intra-network node pair of the DH, each of the protocol instances is operative to select (in any manner -forced, dynamically) a Primary node and a Secondary node in a specific intra-network node pair running the protocol instance, each of the protocol instances enables utilizing inter-network and intra-network paths for carrying data to be communicated via the DH, depending on selection of the Primary and the Secondary nodes in the two intra network node pairs, said DH acquiring:

either a first configuration (named Symmetrical configuration) where direct data communication is established between the Primary node of the first intra-network node and the Primary node of the second intra-network node pair, via an inter-network line out of said four communication lines, or a second configuration (named Asymmetrical configuration) where indirect data communication is established between the Primary node of the first intra-network node pair and the Primary node of the second intra-network node pair, via inter-network and intra-network lines out of said four communication lines.

It should be understood that independent operation of the protocols at node (GW) pairs also means: a GW is not aware of whether its inter-network peer is Primary or Secondary, and would act the same regardless of whether its peer is Primary or Secondary. The "data communication is established between" above should be interpreted as data packet path established without a GW knowing whether the traffic it sends to and receives from the other network goes through a "Symmetrical path" (using the symmetrical configuration) or "Asymmetrical path" (using the Asymmetrical configuration).

The Primary/Secondary role selection is negotiated solely between local GWs, regardless of the roles of the remote network GWs. The Primary/Secondary roles are not fixed, they can dynamically be determined, using the control messages (Hellos) between the two GWs.

It should be kept in mind that each said loop protocol instance is run to prevent L2 loops, i.e. to decide on roles of the nodes in the specific intra-network node pair and thereby to aid in arranging the mentioned four communication lines of the DH to deliver only a single copy of each data packet between the two networks, thereby avoiding traffic duplication.

The proposed solution includes a protocol (a single protocol instance) limited/confined to two local nodes (gateways, GWs) as stated in the objective A2. It is a significant factor, because any of the prior art solutions (3), (4), and (5) that support fully redundant dual homing per objective A1 do not confine the protocol to the GWs of the local network. While prior art (6) does conform to A2, it requires a protocol instance per each physical link that connects a DH to $3^{rd}$ party, and does not confine the CCN to the local network. With respect to the latter, it should be noted that in case of a failure, the proposed DH connection does allow limiting the CCN (MAC addresses flush and further MAC addresses relearning) to the local network, where the failure occurs. It will be disclosed in more detail as the description proceeds.

When there are N networks to be connected to a pair of local GWs, this means that N dual homed connections will be formed. According to the prior art, e.g., prior art (3), the pair of GWs of a local network must run N protocols (N loop protocol instances) for respectively serving these N dual homed connections. In comparison, the proposed method (and in particular, its single protocol instance) is confined to a pair of local GWs, which yields a true scalable and yet simple solution. The scalability is understood here as a possibility of interconnecting, using a DH technology, a plurality of networks wherein each network only needs to run a single instance of the protocol between its local GWs, let alone without a need to be aware of the state of the protocol at any of the remote networks.

In view of the above, there is further proposed such a DH connection, wherein an additional similar DH connection is formed between the first network and an additional (i-th) network, by utilizing the first intra-network node pair and an additional intra-network node pair in the i-th network, and wherein one and the same said protocol instance running on the first intra-network node pair serves: both the DH connection between the first network and the second network, and the additional DH connection between the first network and the additional (i-th) network.

As has been mentioned above, and according to a second main aspect of the invention, there is also provided a method and a suitable protocol for arranging loop-free traffic communication via the DH connection. The main features of the method and the protocol have been disclosed above, partially in terms of the DH connection.

Many operations/features of the proposed method become possible owing to the specific loop protocol being deployed in the DH configuration. The loop protocol comprises basic, known features and a number of characteristic features and rules.

Firstly, the loop protocol is capable of controlling which of the intra-network pair of nodes is Primary and which is Secondary, using the bidirectional intra-network line for exchanging control messages (Hellos) there-between;

Secondly, the method comprises the following "working rules" (and the proposed DH configuration is capable of initially configuring itself using these "working rules"):

(W1) Only a Primary node sends traffic over an inter-network communication line, while a Secondary GW does not send traffic over an inter-network communication line;

(W2) a Primary node receiving traffic over either inter-network or intra-network communication line may forward it to the local network where it resides (or to a remote stub network if packet's destination is there, the stub network being a network presumably connected to the local network only);

(W3) a Secondary node receiving traffic over an inter-network communication line should forward it over the intra-network communication line;

According to these rules:

In the initially Symmetrical configuration, the Primary GWs would be sending and receiving the traffic over the inter-network line, without the Secondary GWs being involved.

In the initially established Asymmetrical configuration, each Primary GW would be sending the traffic over the inter-network line and would be receiving traffic over the intra-network communication line.

Symmetric (Asymmetric) configurations are dynamic and may become Asymmetric (Symmetric), respectively, either by intervention of an operator (e.g., changing GW priority could switch roles between GWs, then Secondary would become Primary) or as a result of a switchover following a failure (e.g., FIG. 5a vs. 5e and FIG. 6a vs. 6e).

It can be seen, at least on examples which will be demonstrated in the Detailed description, that normally the traffic flows from one network to the other networ regardless of whether the configuration is Symmetrical or Asymmetrical, and further that only one copy of traffic is exchanged between the networks (thus no L2 loop is created). All along, whether initially or in the presence of a failure, no GW is aware of the roles of the GWs at the remote network. That is, Primary/Secondary role selection is negotiated solely between local GWs, regardless of the roles of the remote network GWs.

Failures in the proposed DH are handled according to the following "switchover rules":

(S1): If A Primary GW fails, the Secondary GW of local network would take over and become the new Primary.

(S2): If an inter-network line fails, Primary GW not receiving traffic over it would start sending the traffic over the intra-network line instead.

(S3): If an intra-network line fails, GW not receiving traffic over it would start sending remote failure indication (RFI) over the intra-network line and become Primary. The GW receiving RFI would become Secondary and would stop sending traffic over the inter-network link (latter action is referred to as induction)

(S4): If an inter-network line fails, Secondary GW receiving traffic over an intra-network communication line would forward it to the other inter-network communication line.

Note 1: a Primary GW that fails per rule S1 would be seen by the remote network (i.e., by the protocol run on the pair of nodes of the remote network) as if the corresponding inter-network line failed;

Note 2: an intra-network line that fails per rule S3 would be seen by the remote network (i.e., by the protocol run on the other intra-network node pair) as if the inter-network line failed.

In terms of the method, Rule S3 with Note 2 may be formulated as follows: blocking of an inter-network communication line associated with a node of the DH, in case of a failure of an intra-network communication line associated with, and outgoing from said node. Actually, a failure of an intra-network line can be seen as equivalent to a failure of the node from which protocol control messages (or hellos) are not received by its peer node of the intra-network pair. The intra-network line (as any of the lines in the DH) has two directions; the method guarantees recovery when one direction of the intra-net connection is down. The above-defined measure of the so-called "induced" blocking of the inter-network line helps to rebuild the correct rerouting in the DH.

The working rules together with the switchover rules make the proposed DH system self-healing (self-reconfiguring). Upon a single failure, either of GW or inter-network line or one direction of intra-network line, the DH configuration would be fully restored and L2 traffic would resume flowing between the connected networks.

From outside, it can be noticed that in case of a failure of any Primary node of the DH, or of an inter-network line associated with any Primary node of the DH, the remaining nodes and communication lines of the dual homing connection DH are rearranged to restore communication between the first and the second networks by excluding said failed node or said failed inter-network communication line.

Further, for unicast data packets to be forwarded from a local network (being the first network) to a remote network (being the second network), or in the opposite direction, the method/protocol provides the following characteristic rules:

a) while the Primary node receiving a data packet from the local network or from an inter-network line, performs MAC learning (learns its source address SA), the Primary node, in case of receiving from an intra-network line a data packet originating from the remote network, learns its source address SA and handles it as if the packet were received from an inter-network line;

the Primary node, in case of receiving a data packet from the local network, forwards the packet to the remote network over an inter-network line if it is operational (state=Up), otherwise over an intra-network line;

b) while the Secondary node receiving a data packet from the local network or from an intra-network line, does not learn SA, the Secondary node, in case of receiving a data packet from an inter-network line, learns its source address SA and forwards it to the intra-network line to the Primary node;

the Secondary node in case of receiving from an intra-network line a data packet addressed to the remote network, forwards it to the remote network over the inter-network line.

Another key advantage and a characterizing feature of the proposed DH connection is meeting the objective A4, namely—minimizing the necessity of extensive MAC flushing. The proposed DH scheme requires MAC flush only upon switchover to a new Primary GW (per rule S1 or S3), and further this MAC flushing should take place only at the local network where the new Primary GW resides. It should be clear that with the proposed DH technique and the proposed DH connection in particular, MAC flushing is not required at the remote network where the failed Primary node does not reside. Moreover, MAC flush is not required in case of failure of any of the inter-network lines of the DH, this is notable and important since these lines would typically fail more frequently than a GW would fail.

The proposed DH connection may be partially redundant. However, the advantages of the proposed technique can still be utilized.

In one possible embodiment of the DH connection, one of the intra-network pairs of nodes (GWs) is located in one and the same aggregated network node, so that the intra-network communication line connecting GWs/nodes of said pair is a virtual or dummy or internal (within the node) communication line, thereby enabling the support of partial dual homing of single GW in one network to two GWs in another. Thereby, a partially redundant DH connection can be presented similarly to the above-defined fully redundant DH connection and will operate using the proposed method.

The DH connection often includes a third party network between the first and the second communication networks, in other words, the inter-network communication lines pass via a third party (core) network. The third party network preferably does not run a loop protocol with the connected networks and does not provide protection to the inter-network lines.

As mentioned above, there may exist more than one remote communication networks (a second network, and an additional i-th network), to which a local communication network (a first network) may be connected, thereby forming with each of these remote networks a DH connection, wherein the loop protocol is run only once per said specific intra-network node pair (first node pair) serving for each of the DH connections, regardless of how many remote networks, physical lines to 3$^{rd}$ party, or VPNs are associated with the specific intra-network node pair.

According to a further aspect of the invention, there is also proposed a combined network comprising a group of more than two communication networks, wherein one of said networks (a basic network) is interconnected with the remaining two or more communication networks via appropriate DH connections, and wherein each of said DH connections utilizes one and the same intra-network node pair located in said basic network and locally running said loop protocol.

Similarly, the combined network preferably comprises an intermediate (third party) network via which said one or more DH connections are established.

The communication networks are Ethernet (L2) networks preferably supporting multiple VPN instances. Further preferably, they are VPLS networks, the mentioned nodes (Gateways, GWs) of the DH connection are Provider edge nodes (PE), and the inter-network communication lines carrying VPN traffic are H-VPLS spoke pseudo-wires (PWs).

The communication networks may also be conventional Ethernet networks, where VLANs or SVLANs could replace the PWs mentioned above. However the technique proposed in the present application is specifically advantageous for VPLS and H-VPLS technology since VPLS networks with H-VPLS connections in-between, being well defined architectures, lack means/solutions for loop-free fully redundant dual homing.

There is further provided a software product comprising computer implementable instructions and data stored on a suitable computer readable medium; the software product, when being run in a processor of a node of a dual homing connection DH, is capable of enabling operations according to the above-disclosed method, including the newly proposed protocol.

Finally, it should be noted that the non-conventional Asymmetrical configuration forms an integral part of the proposed dual-homing technique. To the best of the Applicant's knowledge, the asymmetrical configuration has never been used/described before.

That new DH connection (system) comprises the same basic components as those mentioned above for a DH connection (two intra-network node pairs wherein the nodes in such a pair are connected by an intra-network communication line, the two intra-network node pairs are interconnected by two inter-network communication lines—in total, four communication lines) and being characterized in that:
a Primary node and a Secondary node are selected in each specific intra-network node pair in such a manner, that each of the inter-network lines connects the Primary node of one intra-network node pair and the Secondary node of the other intra-network node pair;
all the four communication lines are capable of carrying data traffic to be communicated via the DH,
the DH having such a configuration (called asymmetrical configuration), wherein the Primary node of the first intra-network node pair maintains indirect data traffic communication with the Primary node of the second intra-network node pair, via inter-network and intra-network lines out of said four lines.

BRIEF DESCRIPTION OF THE DRAWINGS

The invention will be further described in detail with reference to the following non-limiting drawings in which:
FIGS. 1a, b, c (prior art) show conventional dual homing configurations.
FIG. 2 illustrates one example of a desired network architecture utilizing the proposed dual homing connection (DH).
FIGS. 6a to 6f illustrate how the initially asymmetrical DH connection can be re-configured in case of a failure.

DETAILED DESCRIPTION OF THE INVENTION

Figure 3:
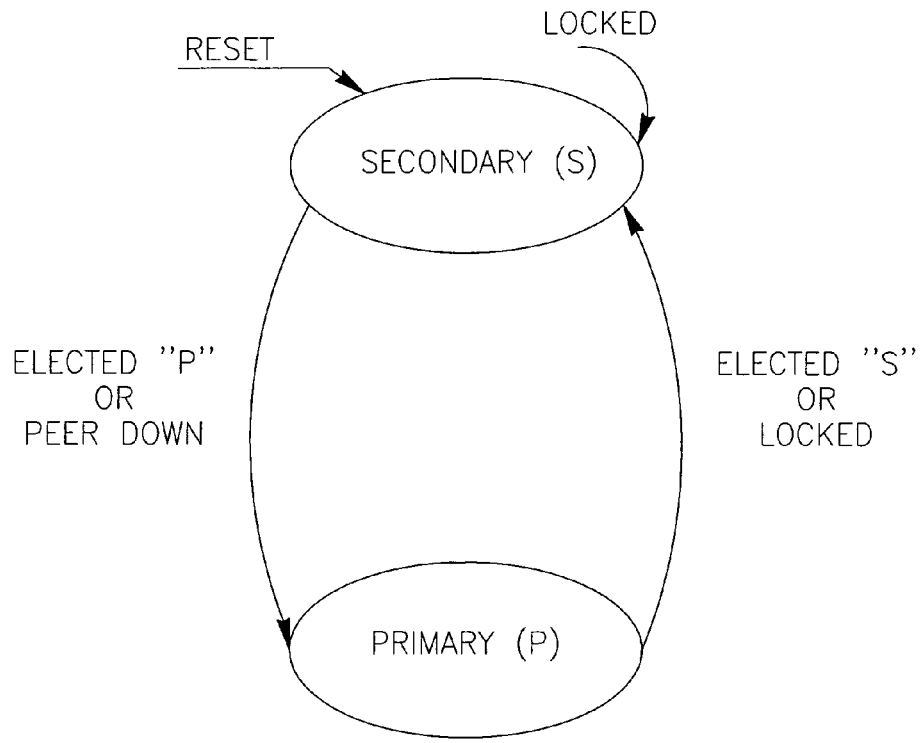
FIG. 3 illustrates the proposed state diagram for the Primary and the Secondary nodes.

FIG. 1 has been referred to in the background description.
FIG. 2 has been referred to in the Summary.
FIG. 3 illustrates a state machine diagram of the basic rule of the loop protocol, namely the rule of Primary versus Secondary node/gateway (GW) in an intra-network node pair.

Each GW is associated with a role, either Primary or Secondary. The role defines the GW's L2 forwarding behavior. At any moment, there should be one Primary GW, while the other GW (if alive) would be Secondary.

The GWs use signaling to elect the Primary GW. This signaling comes in the form of periodic "Hello" packets describing configuration and status information of each sender GW. Typically, the election is based on priority that is assigned to each GW, wherein the GW with the higher priority becomes the Primary. In the case that GWs have same priority, a GW identifier (abbrev. ID) such as unique networking address can be used as a tiebreaker in selecting the Primary GW.

Initially or following a restart (a.k.a., reset), a gateway is at the Secondary state. Once it is elected as Primary, it moves to the Primary state. In the absence of Hello communication between (e.g., a loss of preconfigured number of Hello messages), as would occur if one GW is Down, the other GW will automatically become the Primary GW.

When a GW moves to the Primary state, it performs MAC flush on its local FIB and then floods a CCN message across its local network in order to trigger MAC flush at the PEs, following which they would flood traffic until they do MAC learning.

When conditions change, a role reelection can take place, after which the former Primary GW would move to the Secondary state. A Primary gateway can also move to the Secondary state when it is "Locked". A locked situation happens when the GW detects a configuration mismatch with the peer GW or when it is forced by the operator to become Secondary (Forced Secondary). While locked, a GW cannot become the Primary GW.

A non-revertive mode is also proposed, wherein reelection of a Primary GW would occur only in case of a failure. In non-revertive mode, changing Priority or ID would not initiate reelection.

The Hello period is preferably small (e.g., 5 milliseconds) in order to achieve a recovery time of sub-50 milliseconds. This is realistically achievable owing to the fact that only one instance of the protocol is required, regardless of a number of remote networks, physical links to $3^{rd}$ party, and VPNs served by the GWs.

Figure 4:
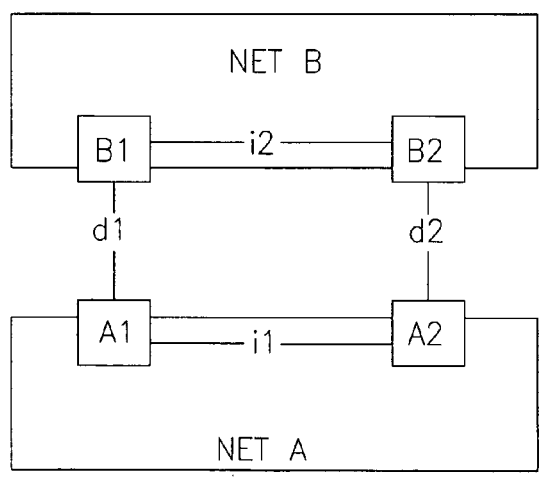
FIG. 4 illustrates the basic configuration of the proposed dual homing connection (DH)

FIG. 4 illustrates the basic configuration that is used to address the objectives. Let us take an example of interconnecting VPLS networks. To connect a network A with two GWs A1 and A2 (a first intra-network node pair) to another network with two GWs B1 and B2 (a second intra-network node pair), we configure 4 spoke PWs per VPN:

PW d1 between GW A1 and GW B1
PW d2 between GW A2 and GW B2
PW i1 between GW A1 and GW A2
PW i2 between GW B1 and B2 d1 and d2 are inter-networks communication lines, and are referred to as direct PWs (d-PWs), as they directly connect the networks. i1 and i2 are intra-network communication lines and are referred to as indirect PWs (i-PWs), as they indirectly connect the networks. It is assumed that each of the d-PWs and i-PWs is monitored at least at the receiving direction, so in case of fault the GW will detect it and can take an action. This monitoring can be realized using operation and maintenance (OAM) tools at the PW level or at the level of the MPLS tunnel that carries the PW or PWs to remote network (tunnel OAM, e.g. per ITU-T Y.1711). These tools may be enhanced (e.g., by implementing smaller continuity verification period) to achieve faster protection times.

The discussion is limited to a single point of failure, i.e. at any time only one of the 8 elements (4 GWs, 2 d-PWs, 2 i-PWs) would fail, though a multi-failure may also be recoverable using the rules defined in this description.

It is assumed that each i-PW is protected via MPLS mechanisms (e.g. FRR or PW redundancy) and is thus quite robust, and then we can reasonably assume that at most only one of two directions of an i-PW would fail. It is also assumed that i-PW is used for the communication between the GWs, i.e. it carries both customer traffic and the Hello packets. The separation between these two traffic types can be done by classifying the Hello packets as OAM packets.

If a d-PW is configured statically (via management system), a GW that does not receive traffic over a d-PW must shut clown its transmission on the PW, so that the peer GW will sense it is faulty too.

Since the loop-free protocol is only run between two local GWs of each network (over each intra-network node pair), there are two possible configurations of Primary of one network vs. the Primary of the other network, as will be discussed next.

Figure 5:
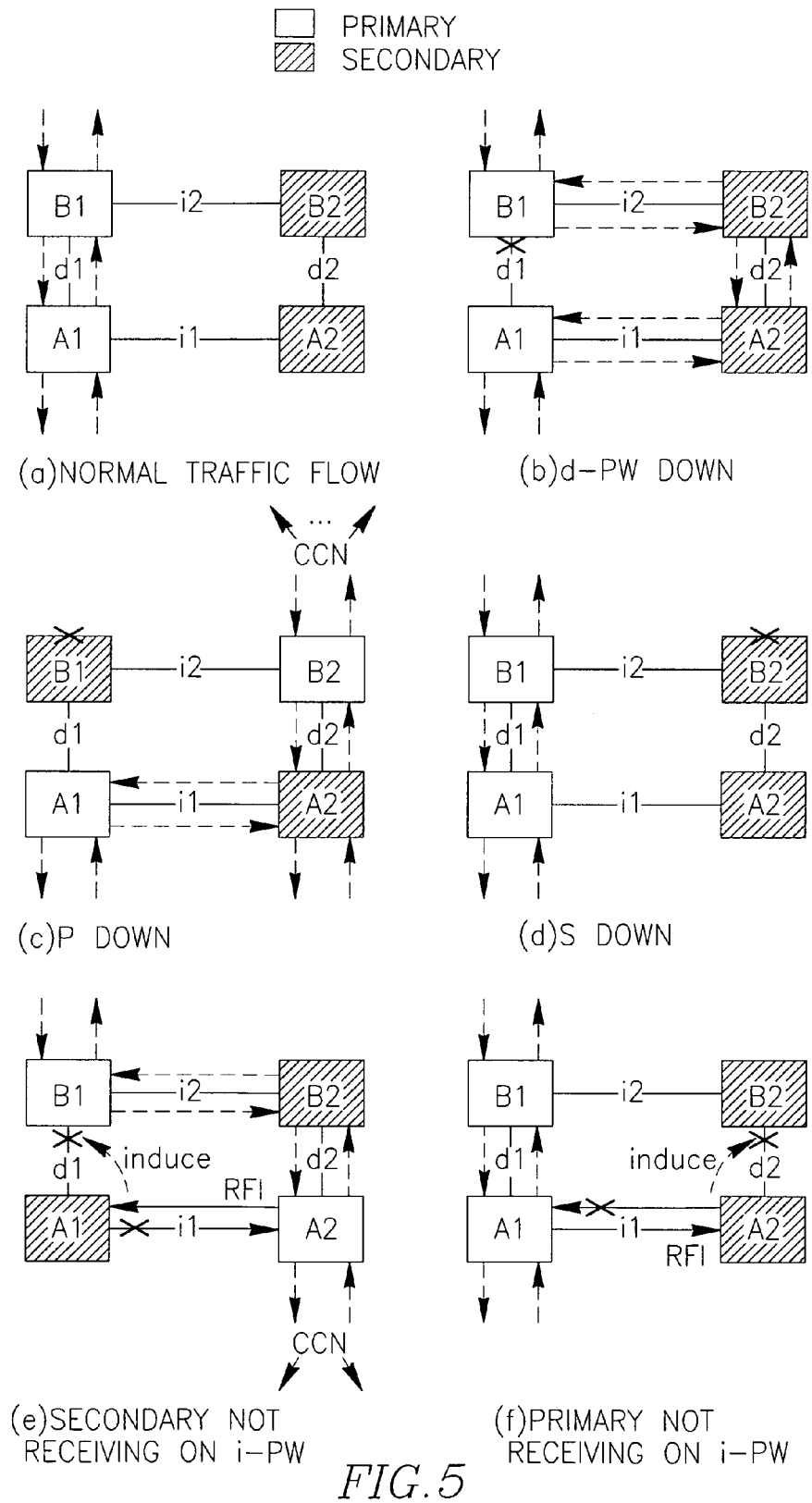
FIGS. 5a to 5f illustrate how the proposed DH connection can be re-configured in case of a failure, if the initial DH configuration is symmetrical.

FIG. 5 illustrates traffic flow scenarios for an initially symmetric configuration of two pairs of GWs in the proposed Dual Homing connection, wherein (initially) the Primary GW of one network is directly connected (via d-PW) to the Primary GW of the other network. This configuration is viable though changeable, since the two GWs of each network independently run a protocol to determine who is the Primary GW. The Primary nodes are shown as light boxes, while the Secondary nodes are illustrated as dark boxes.

There are 5 scenarios, marked (a) through (e):

(a) Normal Traffic Flow:
The initial symmetric configuration of the proposed Dual Homing connection. This scenario assumes that all four GWs, two d-PWs, and two i-PWs are operational. In this case, the traffic flows from one network to the other via the d-PW connecting the Primary GWs.

Traffic sourced at network A flows to destination at network B as follows:
Packet arrives from source node at network A to Primary A1
A1 forwards the packet over d1 to Primary B1
B1 forwards the packet to destination node at network B
Traffic sourced at network B flows to destination at network A similarly but in opposite direction.

(b) d-PW Down (Failure of an Inter-Network Line):
When one or both directions of a d-PW (d1) is faulty, a Primary GW (A1) does not use it and instead would send the traffic over the i-PW (i1) to the Secondary GW(A2), which in turn will forward it to remote network over its d-PW (d2). The Secondary GW (B2) at remote network will forward the traffic to the Primary GW (B1) over i-PW (i2).

Traffic sourced at network A flows to destination at network B as follows:
Packet arrives from source node at network A to Primary A1
A1 forwards the packet over d1 to Secondary A2
A2 forwards the packet over d2 to Secondary B2
B2 forwards the packet over i2 to Primary B1
B1 forwards the packet to destination node at network B
Traffic sourced at network B flows to destination at network A similarly but in opposite direction.

(c) Primary Node is Down:
When a Primary GW (B1) becomes faulty, its peer (B2) over the i-PW (i2) becomes the Primary GW. The new Primary GW (B2) floods CCN message over the local network (for MAC flush). No changes are required at the second network.

Traffic sourced at network A flows to destination at network B as follows:
Packet arrives from source node at network A to Primary A1
A1 forwards the packet over d1 to Secondary A2
A2 forwards the packet over d2 to Primary B2
B2 forwards the packet to destination node at network B
Traffic sourced at network B flows to destination at network A similarly but in opposite direction.

(d) Secondary Node is Down:
When a Secondary GW (B2) becomes faulty, traffic flow does not change and is as described in scenario (a).

(e) Secondary Node Not Receiving on i-PW:
When an i-PW (an intra-network line) is faulty at the direction towards Secondary GW (A2), the Secondary GW (A2) would send a remote fault indication (RFI) to its peer (A1) which in turn would become Secondary and also shut down transmission over its d-PW (d1), the latter action is referred to as induction. The new Primary GW (A2) floods CCN message over the local network (for MAC flush). No changes are required at the opposite (first) network.

Traffic sourced at network A flows to destination at network B as follows:
Packet arrives from source node at network A to Primary A2
A2 forwards the packet over d2 to Secondary B2
B2 forwards the packet over i2 to Primary B1
B1 forwards the packet to destination node at network B
Traffic sourced at network B flows to destination at network A as follows:
Packet arrives from source node at network B to Primary B1
B1 forwards the packet over i2 to Secondary B2
B2 forwards the packet over d2 to Primary A2
A2 forwards the packet to destination node at network A (f) Primary Node Not Receiving on i-PW:
When an i-PW (i1) is faulty at the direction towards Primary GW (A1), the Primary GW (A1) would send a remote fault indication (RFI) to its peer (A2) which in turn would shut down transmission over its d-PW (d2), the latter action is referred to as induction. Yet, traffic flow does not change and is as described in scenario (a).

FIG. 6, in turn, illustrates traffic scenarios in the proposed DH connection initially having an Asymmetric Configuration. The Primary nodes are shown as light boxes, and the Secondary nodes—as dark boxes.

(a) Normal Traffic Flow:
The initial DH configuration is asymmetrical. This scenario assumes that all four GWs, two d-PWs, and two i-PWs are operational. In this case, the traffic flows from one network to the other using the d-PWs connecting the Primary GWs, though the traffic flow is indirect.

Traffic sourced at network A flows to destination at network B as follows:
Packet arrives from source node at network A to Primary A2
A2 forwards the packet over d1 to Secondary B2
B2 forwards the packet over i2 to Primary B1
B1 forwards the packet to destination node at network B
Traffic sourced at network B flows to destination at network A similarly but in opposite direction.

(b) d-PW (inter-network communication line) is down:
When one or both directions of a d-PW (d1) is faulty, a Primary GW (B1) does not use it and instead would send the traffic over the i-PW (i2) to the Secondary GW(B2), which in turn will forward it to remote network over its d-PW (d2) to the Primary GW (A2) at remote network.

Traffic sourced at network A flows to destination at network B as follows:
Packet arrives from source node at network A to Primary A2
A2 forwards the packet over d2 to Secondary B2
B2 forwards the packet over i2 to Primary B1
B1 forwards the packet to destination node at network B
Traffic sourced at network B flows to destination at network A as follows:
Packet arrives from source node at network B to Primary B1
B1 forwards the packet over i2 to Secondary B2
B2 forwards the packet over d2 to Primary A2
A2 forwards the packet to destination node at network A (c) Primary Node is Down:
When a Primary GW (B1) becomes faulty, its peer (B2) over the i-PW (i2) becomes the Primary GW. The new Primary GW (B2) floods CCN message over the local network, to perform MAC flush. No changes are required at the other (first) network.

Traffic sourced at network A flows to destination at network B as follows:
Packet arrives from source node at network A to Primary A2
A2 forwards the packet over d2 to Primary B2
B2 forwards the packet to destination node at network B
Traffic sourced at network B flows to destination at network A similarly but in opposite direction.

(d) Secondary Node is Down:
When a Secondary GW (B2) becomes faulty, the Primary GW (A2) at the remote network stops sending traffic on the d-PW (d2) and instead would send traffic to remote network via the i-PW (d1) to the Secondary GW (A1) which would forward it to remote network via the d-PW (d1).

Traffic sourced at network A flows to destination at network B as follows:
Packet arrives from source node at network A to Primary A2
A2 forwards the packet over i1 to Secondary A1
A1 forwards the packet over d1 to Primary B1
B1 forwards the packet to destination node at network B
Traffic sourced at network B flows to destination at network A as follows:
Packet arrives from source node at network B to Primary B1
B1 forwards the packet over d1 to Secondary A1
A1 forwards the packet over i1 to Primary A2
A2 forwards the packet to destination node at network A (e) Secondary node not receiving on i-PW:
When an i-PW is faulty at the direction towards Secondary GW (A1), the Secondary GW (A1) would send a remote fault indication (RFI) to its peer (A2) which in turn would become Secondary and also shut down transmission over its d-PW (d2), the latter action is referred to as induction. The new Primary GW (A1) floods CCN message over the local network (for MAC flush and MAC address relearning). No changes are required at the second network.

Traffic sourced at network A flows to destination at network B as follows:
Packet arrives from source node at network A to Primary A1
A1 forwards the packet over d1 to Primary B1
B1 forwards the packet to destination node at network B
Traffic sourced at network B flows to destination at network A similarly but in opposite direction.

(f) Primary Node Not Receiving on i-PW:
When an i-PW (i1) is faulty at the direction towards Primary GW (A2), the Primary GW (A2) would send a remote fault indication (RFI) to its peer (A1) which in turn would shut down transmission over its d-PW (d1), the latter action is referred to as induction. The Primary GW (B1) at the remote network stops sending traffic on the d-PW (d1) and instead would send traffic to remote network via the i-PW (i2) to the Secondary GW (B2) which would forward it to remote network via the d-PW (d2).

Traffic sourced at network A flows to destination at network B as follows:
Packet arrives from source node at network A to Primary A2
A2 forwards the packet over d2 to Secondary B2
B2 forwards the packet over i2 to Primary B1
B1 forwards the packet to destination node at network B Traffic sourced at network B flows to destination at network A as follows:

Packet arrives from source node at network B to Primary B1

B1 forwards the packet over i2 to Secondary B2

B2 forwards the packet over d2 to Primary A2

A2 forwards the packet to destination node at network A

The scenarios illustrated in FIGS. 5 and 6 allow formulating the main forwarding and MAC learning rules of the proposed protocol.

In the frame of the present patent application, the main forwarding rules and MAC learning rules will be formulated for unicast packets which are transmitted via the proposed DH connection from the first (local) network to the second (remote) network or vice versa.

Though rules for other possible cases have been developed, we will not discuss here aspects of handling data packets which are sent from and come back to the same local network. Also, we will not discuss flooding rules related to multicast packets, broadcast packets and packets with unknown destination.

Unicast Forwarding Rules:

Primary GW receiving a packet from local network and whose destination is at remote network, will forward the packet to that network over d-PW if the d-PW is Up and otherwise over i-PW.

Primary GW receiving a packet from d-PW or i-PW and whose destination is within local network, would forward it to local network; otherwise if the destination is at remote stub network, it would forward the packet to that network over d-PW if the d-PW is Up and otherwise over i-PW; otherwise, the GW should discard the packet.

Secondary GW receiving a packet from d-PW would only send it to Primary GW via i-PW. Secondary GW receiving a packet from i-PW and the packet destination is at a remote network, would forward it to the remote network over d-PW.

MAC Learning Rules:

Primary GW receiving a packet from local network performs ordinary MAC learning.

Primary GW receiving a packet from d-PW performs ordinary MAC learning.

Primary GW receiving a packet from i-PW performs MAC learning as if the packet arrived from d-PW.

Secondary GW does not apply MAC learning on traffic arriving from local network.

Secondary GW does not apply MAC learning on traffic arriving from i-PW. Secondary GW receiving a packet from d-PW performs ordinary MAC learning.

Figure 7:
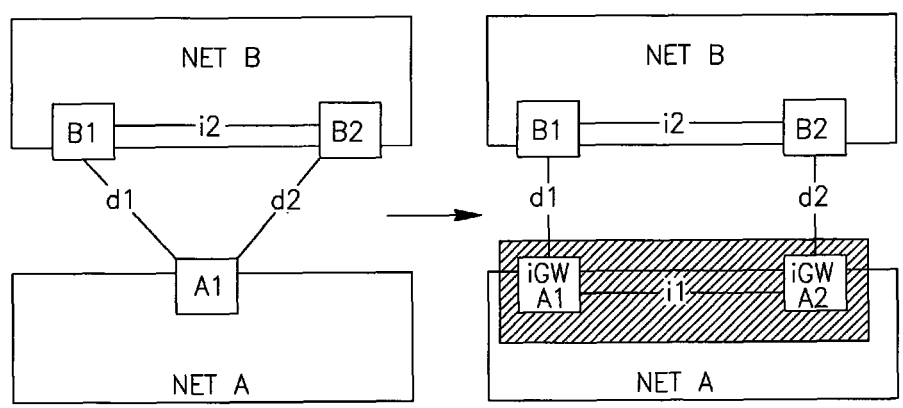
FIG. 7 illustrates a partially redundant DH configuration according to the invention.

FIG. 7 illustrates a partially redundant dual-homing. This configuration is a specific case of FIG. 4 where network A includes only one GW (A1). Such an arrangement can be supported based on the rules described earlier in the description, as follows:

Subdividing the single GW (A1) to two internal GWs (iGWs 1 and 2). Each iGW will be assigned a role similarly to the fully redundant dual homing case, however no protocol is required to run between the iGWs as they reside within the same node.

Per remote network, one d-PW will belong to i-GW1, and the other will belong to iGW2. In addition, a virtual (or dummy) i-PW (i1) will be established between the iGWs.

With this scheme, Priority, ID and Forced Secondary are configured per iGW.

The scenarios for partially redundant dual homing are then similar to those described with reference to FIG. 4, yet the cases where i-PW fails (e) and (f) may not be relevant for the network with iGW because its i-PW may be virtual/dummy and never fail.

The objectives A1-A12 and B1-B6 stated in the Summary have been met by the described DH technology:

A1, A2: explained with reference to FIGS. 3 to 6.

A3: A No-Protocol network can benefit from fully redundant dual homing by connecting it the same way as other network, with several exceptions which are not disclosed in the frame of the present description.

A4: As illustrated in FIG. 5 and FIG. 6, CCN (for MAC flush and relearning) is limited to the local network only. Moreover, in the event that a d-PW fails, CCN is not required at all as the Primary GW keeps its role and just detours around the failed d-PW.

A5: The simplicity of the protocol is made vivid via the two-state diagram of FIG. 3. The proposed solution does not use complex xSTP protocols which are widely utilized by the prior art references.

A6: only two connections are required for fully redundant dual homing.

A7: Recovery is fully automatic and can be fast by setting a small period for the Hello packets. Considering that only a single protocol is required per pair of GWs, this small Hello period is practical.

A8: a single protocol instance is required between two GW peers, regardless of how many physical links are used to connect to remote networks. If the GWs switch roles, that applies for all physical links used to connect to remote networks.

A9: a single protocol instance is required between two GW peers, regardless of how many VPNs are established with remote networks. Note that the "quartet" of two d-PWs and two i-PWs is setup per VPN, yet the protocol applies to all quartets setup (In other words, a single protocol is required between each two local GWs no matter how many VPNs are served there, while each VPN requires a quartet of 4 PWs) to connect to remote networks.

A11, A12: all the mentioned implementations are supported.

B1-B4: The examples given assumed no role for a $3^{rd}$ party core network, apart from requiring the network to provide two pipes between any two connected networks and transparently delivering the d-PW traffic over them. This transparency of $3^{rd}$ party core network allowed to totally omit it in the description.

B5: $3^{rd}$ party core network need not protect the pipes, because the GWs monitor the d-PW using their own means. However, if it does protect the pipes, the switchover time should be smaller than the time it takes the GWs to detect a failure of the d-PWs, in order to avoid unnecessary switchover at the GWs.

B6: all the realizations mentioned are supported.

It should be appreciated that other modifications of the DH connection and other versions of the method may be suggested, which should be considered part of the invention whenever defined by the claims which follow.

The invention claimed is:

1. A method for establishing loop free data communication between a first communication network and a second communication network via a dual homing (DH) connection, wherein the DH connection is formed by four nodes and a ring-like connection there-between provided by four communication lines, two of said lines being inter-network lines respectively connecting two inter-network pairs out of said nodes, wherein each said inter-network pair comprises nodes residing in different said two networks, and the remaining two of said lines being intra-network lines respectively connecting two intra-network pairs of said nodes called intra-network node pairs, wherein a first intra-network node pair resides in the first communication network and a second intra-network node pair resides in the second communication network, the method comprising:

ensuring that all the four communication lines are configured to carry data traffic to be communicated via the DH connection;

locally running on each of the two intra-network node pairs an instance of a loop protocol via its associated intra-network line, independently from the protocol instance run on the other intra-network node pair of the DH connection;

independently and dynamically selecting, by each of the protocol instances, a Primary node and a Secondary node in a specific intra-network node pair running the protocol instance;

enabling each of the intra-network node pairs to utilize suitable inter-network and intra-network paths for carrying data traffic to be communicated via the DH connection;

wherein said DH connection is adapted to operate in a symmetric configuration, where direct data communication is established between the Primary node of the first intra-network node pair and the Primary node of the second intra-network node pair, via an inter-network line out of said four communication lines, and in an asymmetrical configuration where indirect data communication is established between the Primary node of the first intra-network node pair and the Primary node of the second intra-network node pair, via inter-network and intra-network lines out of said four communication lines;

and configuring said first intra-network node pair and said second intra-network node pair to implement traffic forwarding rules which are independent of whether the configuration of the DH connection is a symmetric or an asymmetric configuration, thereby ensuring that each Primary node is agnostic to whether it is connected to a Primary node or to a Secondary node of the other communication network, and each Secondary node is agnostic to whether it is connected to a Primary node or to a Secondary node of the other communication network; and avoiding duplication of traffic originating in one of said first communication network and said second communication network when said traffic needs to be conveyed from one of said communication networks to the other via said dual homing (DH) connection.

2. The method according to claim 1, wherein said protocol provides the following Working rules W1 to W3 for establishing the initial configuration of the DH connection:

(W1) only the Primary node sends traffic over the inter-network communication line, while the Secondary node does not send traffic over the inter-network communication line;

(W2) the Primary node receiving traffic over either inter-network or intra-network communication line forwards the received traffic to the local network where said Primary node resides; and

*(W3) the Secondary node receiving traffic over an inter-network communication line forwards said traffic over the intra-network communication line.

3. The method according to claim 1, wherein the protocol provides the following Switchover rules S1 to S4 for reconfiguring the DH connection upon a failure:

(S1) when the Primary node fails, the Secondary node of the same intra-network node pair takes over and becomes a new Primary node, wherein the failed Primary node is seen by the protocol run on the other intra-network node pair as if the associated inter-network communication line failed;

(S2) when the inter-network communication line fails, the Primary node not receiving traffic over the inter-network communication line starts sending the traffic over the intra-network communication line instead;

(S3) when the intra-network communication line fails, a node not receiving traffic over said intra-network communication line starts sending remote failure indication (RFI) over said line intra-network communication and becomes Primary; the node receiving the RFI becomes Secondary and stops sending traffic over the associated inter-network communication line, thereby said inter-network line is seen as failed by the protocol run on the other intra-network node pair; and (S4) when the inter-network line fails, the Secondary node receiving traffic over an intra-network communication line forwards the received traffic to the other inter-network communication line.

4. The method according to claim 1, wherein the protocol provides the following Forwarding rules F1, F2 of the Primary node and F3, F4 of the Secondary node for handling unicast data packets to be forwarded from a local network being the first network to a remote network being the second network, or in the opposite direction:

F1) the Primary node, in case of receiving from the intra-network line a data packet originating from the remote network, learns the data packet source address (SA) and handles the data packet as if the packet were received from the inter-network line;

F2) the Primary node, in case of receiving a data packet from the local network, forwards the data packet to the remote network over the inter-network line if the inter-network line is Up, otherwise over the intra-network line;

F3) the Secondary node, in case of receiving a data packet from the inter-network line, learns the data packet source address SA and forwards the data packet to the intra-network line to the Primary node; and F4) the Secondary node in case of receiving from the intra-network line a data packet addressed to the remote network, forwards the data packet to the remote network over the inter-network line.

5. A software product comprising computer implementable instructions and data stored on a suitable non-transitory computer readable medium, wherein the software product, when being run in a processor of a node of a dual homing DH connection, is configured to execute the method of claim 1.

6. A dual homing (DH) connection for loop-free data communication between a first communication network and a second communication network, wherein the DH connection comprises four nodes and a ring-like connection formed there-between by four communication lines, two of said lines being inter-network lines respectively connecting two inter-network pairs out of said nodes where each inter-network pair comprises nodes residing in different said two networks, and the remaining two of said lines being intra-network lines respectively connecting two intra-network pairs of said nodes, called intra-network node pairs, where a first intra-network node pair resides in the first communication network and a second intra-network node pair resides in the second communication network, in the DH connection:
- all the four communication lines are configured to carry data traffic to be communicated via the DH connection;
- each of the two intra-network node pairs locally configured to run an instance of a loop protocol via its associated intra-network line, independently from the protocol instance run by the other intra-network node pair of the DH connection;
- each of the protocol instances is operative to independently and dynamically select a Primary node and a Secondary node in a specific intra-network node pair running the protocol instance; and
- each of the protocol instances enables utilizing inter-network and intra-network paths for carrying data traffic to be communicated via the DH connection;
- wherein said DH connection is adapted to operate in a symmetric configuration, where direct data communication is established between the Primary node of the first intra-network node and the Primary node of the second intra-network node pair, via an inter-network line out of said four communication lines, and in an asymmetrical configuration where indirect data communication is established between the Primary node of the first intra-network node pair and the Primary node of the second intra-network node pair, via inter-network and intra-network lines out of said four communication lines;
- wherein said first intra-network node pair and said second intra-network node pair are configured to implement traffic forwarding rules which are independent of whether the configuration of the DH connection is a symmetric or an asymmetric configuration,
- thereby ensuring that each Primary node is agnostic to whether it is connected to a Primary node or to a Secondary node of the other communication network, and each Secondary node is agnostic to whether it is connected to a Primary node or to a Secondary node of the other communication network; and
- avoiding duplication of traffic originating in one of said first communication network and said second communication network when said traffic needs to be conveyed from one of said communication networks to the other via said dual homing (DH) connection.

7. The DH connection according to claim 6, wherein an additional similar DH connection is formed between the first network and an additional, i-th network, by utilizing the first intra-network node pair and an additional intra-network node pair in the i-th network, and wherein one and the same said protocol instance running on the first intra-network node pair serves both the DH connection between the first network and the second network, and the additional DH connection between the first network and the additional i-th network.

8. The DH connection according to claim 6, being self-reconfigurable in case of a failure of any Primary node of the DH connection, or of an inter-network so that the remaining nodes and communication lines of the DH connection are rearranged to restore communication between the first and the second networks by excluding said failed node or said failed inter-network communication line, and so that at least one of the intra-network communication lines is utilized to carry said data traffic before or after said failure.

9. The DH connection according to claim 6, configured to be operative to perform MAC flushing and MAC address relearning only in case of failure of any of the Primary nodes of the DH connection, and only at the network where the failed Primary node resides.

10. A combined network comprising a group of more than two communication networks, wherein one of said networks called a basic network is interconnected with the remaining two or more communication networks, wherein the connection between the basic network and each of the remaining two or more communication networks is a DH connection according to claim 6, and wherein each of said DH connections utilizes one and the same intra-network node pair located in said basic network and locally running said protocol instance.

* * * * *